US011427179B2

(12) United States Patent
Oiwa

(10) Patent No.: US 11,427,179 B2
(45) Date of Patent: Aug. 30, 2022

(54) POWER SUPPLY SYSTEM

(71) Applicant: HONDA MOTOR CO., LTD., Tokyo (JP)

(72) Inventor: Hisaya Oiwa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 311 days.

(21) Appl. No.: 16/882,767

(22) Filed: May 26, 2020

(65) Prior Publication Data

US 2020/0377073 A1    Dec. 3, 2020

(30) Foreign Application Priority Data

May 28, 2019    (JP) .............................. JP2019-099674

(51) Int. Cl.
| | |
|---|---|
| *B60W 20/10* | (2016.01) |
| *H01M 10/44* | (2006.01) |
| *H01M 10/48* | (2006.01) |
| *H02J 7/34* | (2006.01) |
| *H02H 3/08* | (2006.01) |
| *B60W 10/08* | (2006.01) |
| *B60K 6/28* | (2007.10) |

(Continued)

(52) U.S. Cl.
CPC .............. *B60W 20/10* (2013.01); *B60K 6/26* (2013.01); *B60K 6/28* (2013.01); *B60L 58/10* (2019.02); *B60W 10/08* (2013.01); *H01M 10/44* (2013.01); *H01M 10/48* (2013.01); *H02H 3/08* (2013.01); *H02J 7/34* (2013.01); *H02M 7/5395* (2013.01); *H02P 27/08* (2013.01); *B60L 2240/527* (2013.01); *B60L 2240/529* (2013.01); *B60L 2240/547* (2013.01); *B60L 2240/549* (2013.01)

(58) Field of Classification Search
CPC . B60L 58/10; B60K 6/26; B60K 6/28; B60W 20/10; B60W 10/08; H01M 10/44; H01M 10/48; H02H 3/08; H02J 7/34; H02M 7/5395; H02P 27/08
See application file for complete search history.

(56) References Cited

U.S. PATENT DOCUMENTS

| | | | | |
|---|---|---|---|---|
| 2017/0365867 | A1* | 12/2017 | Tano | ........................ B60L 58/30 |
| 2021/0016671 | A1* | 1/2021 | Suzuki | .................. B60L 15/007 |
| 2021/0119539 | A1* | 4/2021 | Hasegawa | ........... H02M 3/1582 |

FOREIGN PATENT DOCUMENTS

| | | |
|---|---|---|
| JP | 2017169311 A | 9/2017 |
| JP | 2018057244 A | 4/2018 |

* cited by examiner

*Primary Examiner* — Said Bouziane
(74) *Attorney, Agent, or Firm* — CKC & Partners Co., LLC

(57) ABSTRACT

The power supply system includes: a first power circuit having a first battery, a second power circuit having a second battery, a voltage converter which converts voltages between both circuits, voltage sensors which acquire a first circuit voltage value V1 and second circuit voltage value V2, a current sensor which acquires a passing current value Iact, and a passing power control unit which operates the voltage converter. The passing power control unit performs PWM control under a control duty ratio obtained by summing a correction duty ratio calculated based on the current deviation change rate and a base duty ratio, in a case of, after starting PWM control under the base duty ratio decided based on the voltage values V1, V2 during activation of the voltage converter, the value of current deviation between a passing current value Iact and activation target value Itrg exceeding a permitted range.

8 Claims, 11 Drawing Sheets

(51) Int. Cl.
*H02M 7/5395* (2006.01)
*B60L 58/10* (2019.01)
*B60K 6/26* (2007.10)
*H02P 27/08* (2006.01)

POWER SUPPLY SYSTEM

This application is based on and claims the benefit of priority from Japanese Patent Application No. 2019-99674, filed on 28 May 2019, the content of which is incorporated herein by reference.

BACKGROUND OF THE INVENTION

Field of the Invention

The present invention relates to a power supply system. In more detail, it relates to a power supply system equipped with a first circuit having a first power source, a second circuit having a second power source, and a voltage converter which converts the voltage between these first and second circuits.

Related Art

In recent years, the development has been active of electric vehicles such as electric transport equipment equipped with a drive motor as a power generation source, and hybrid vehicles equipped with a drive motor and internal combustion engine as power generation sources. In such electric vehicles, a power supply device such as a capacitor (battery, etc.) and fuel cell for supplying electrical energy to the drive motor is also built in. In addition, in recent years, a vehicle equipped with a plurality of power supply devices having different characteristics in an electric vehicle has also been developed.

Japanese Unexamined Patent Application, Publication No. 2017-169311 shows a power supply system of an electric vehicle which includes a power circuit connecting a first capacitor and a drive unit configured from a drive motor, inverter, etc.; a second capacitor connected via this power circuit and a voltage converter, and a controller which performs switching control on this voltage converter. The controller sets the target current for the passing current, which is the electrical current passing through the voltage converter according to a demand from the driver, as well as performing switching control of the voltage converter so that the passing current becomes the target current to synthesize the electric power outputted from the first capacitor and the electric power outputted from the second capacitor.

In addition, as in the power supply system of Japanese Unexamined Patent Application, Publication No. 2017-169311, in the case of connecting two power supply devices by a voltage converter, if the voltage converter fails, there are cases where passing current of unintended direction and magnitude will flow. Therefore, with the power supply system of Japanese Unexamined Patent Application, Publication No. 2018-57244, during execution of switching control of the voltage converter by the controller, in the case of a shift arising between the target current and passing current detected by a current sensor, the voltage converter is determined as having failed.

SUMMARY OF THE INVENTION

However, the duty ratio during activation of a voltage converter is decided based on the detection value of a voltage sensor provided to both circuits. Nevertheless, since error exists in these voltage sensors, there are cases where passing current is disturbed during activation of the voltage converter due to this error. The disturbance of passing current caused by such error is a magnitude of an extent that the above-mentioned overcurrent protection function will not work; however, since noise is generated by large electrical current flowing to the reactor of the voltage converter, and loss of energy occurs by large electrical current flowing to a capacitor, there is concern over the quality declining, and thus is preferable to suppress to the utmost.

The present invention has an object of providing a power supply system, in which a first circuit provided with a first power source and a second circuit provided with a second power source are connected by a voltage converter, that is capable of activating the voltage converter while suppressing disturbance of the passing current.

A power supply system (for example, the power supply system 1 described later) according to a first aspect of the present invention includes: a first circuit (for example, the first power circuit 2 described later) having a first power source (for example, the first battery B1 described later); a second circuit (for example, the second power circuit 3 described later) having a second power source (for example, the second battery B2 described later); a voltage converter (for example, the voltage converter 5 described later) which converts voltage between the first circuit and the second circuit; a power converter (for example, the power converter 43 described later) which converts electric power between the first circuit and a drive motor (for example, the drive motor M described later); a first circuit voltage sensor (for example, the first circuit voltage sensor 24 described later) which acquires a first circuit voltage value that is a voltage value of the first circuit; a second circuit voltage sensor (for example, the second circuit voltage sensor 34 described later) which acquires a second circuit voltage value that is a voltage value of the second circuit; a passing current sensor (for example, the current sensor 33 described later) which acquires a passing current value that is an electrical current value of the voltage converter; and a control unit (for example, the passing power control unit 73a, 76a described later) which operates the voltage converter according to PWM control, in which the control unit, in a case of, after starting PWM control under a base duty ratio decided based on the first and second circuit voltage values so that the passing current value becomes a predetermined target value, a value of current deviation between the passing current value and the target value exceeding a permitted range during activation of the voltage converter, performs PWM control under a duty ratio obtained by summing the base duty ratio and a correction duty ratio calculated based on the value of the current deviation.

According to a second aspect of the present invention, in this case, it is preferable for the control unit ends PWM control that is being executed, in a case of the passing current value during execution of PWM control exceeding a protection range that includes the permitted range.

According to a third aspect of the present invention, in this case, it is preferable for the control unit calculates the correction duty ratio based on a change rate of the value of the current deviation from after starting the PWM control under the base duty ratio until the value of the current deviation exceeds the permitted range.

According to a fourth aspect of the present invention, in this case, it is preferable for the power supply system to further include: a simulation arithmetic unit which estimates error of the first circuit voltage sensor and the second circuit voltage sensor, by performing simulation based on time-series data of the value of the current deviation from after starting PWM control under the base duty ratio until the value of the current deviation exceeds the permitted range, and calculates an optimum correction duty ratio, which is an optimum value for the correction duty ratio such that makes deviation between the passing current value and the target value a minimum, in a case of starting PWM control under the error, in which the control unit starts PWM control under a duty ratio obtained by summing the base duty ratio and the optimum correction duty ratio, during activation of the voltage converter after error of the first circuit voltage sensor and the second circuit voltage sensor has been calculated by the simulation arithmetic unit.

The power supply system according to the first aspect of the present invention includes a first circuit having the first battery, second circuit having the second battery, voltage converter which converts voltages between these circuits, and control unit which operates this voltage converter according to PWM control. The control unit decides a base duty ratio such that the passing current value becomes the target value based on the first and second circuit voltage values acquired by the first and second circuit voltage sensors during activation of the voltage converter, and starts PWM control under this base duty ratio. At this time, if there is error in the first and second circuit voltage sensors, the passing current value will deviate from the target value, and the value of the current deviation between the passing current value and target value may exceed the permitted range.

Therefore, in a case of starting PWM control under the base duty ratio, and then the value of the current deviation exceeding the permitted range, the control unit calculates a correction duty ratio based on the value of the current deviation, and performs PWM control under a duty ratio obtained by summing this correction duty ratio and base duty ratio. According to the present invention, it is thereby possible to activate the voltage converter, while suppressing the passing current from being disturbed to greatly exceed the permitted range.

In the second aspect of the present invention, the control unit ends PWM control which is being executed, in a case of the passing current value exceeding a protection range including the permitted range, during execution of PWM control, i.e. case of overcurrent occurring. While performing PWM control of the voltage converter, it is thereby possible to protect various electrical components provided to the first circuit or second circuit, in a case of overcurrent exceeding the protection range flowing for any reason.

In the third aspect of the present invention, the control unit calculates the correction duty ratio based on the change rate of the value of current deviation from after starting PWM control under the base duty ratio until the value of the current deviation exceeds the permitted range. The magnitude of error in the first circuit voltage sensor or second circuit voltage sensor has a correlation with the change rate of the value of current deviation immediately after starting PWM control. Consequently, the present invention can calculate an appropriate correction duty ratio such that brings the passing current value closer to the target value, based on the change rate of the value of current deviation. In addition, since the permitted range is set in the protection range for overcurrent protection in the aforementioned way, the time required from after starting PWM control under the base duty ratio until the value of the current deviation exceeds the permitted range is very short. In this regard, in order to calculate the change rate of the value of current deviation, it is sufficient for there to be the three sets of data of the time required from after starting PWM control until determining that the value of current deviation exceeded the permitted range, the value of current deviation during start of the PWM control, and the value of current deviation when determining that the value of current deviation exceeded the permitted range. Consequently, according to the present invention, since it is possible to calculate the correction duty ratio by a simple computation, PWM control can be continuously performed even after the value of current deviation exceeds the permitted range.

In the fourth aspect of the present invention, by performing simulation based on the time-series data of the value of the current deviation when the voltage converter is activated, the simulation arithmetic unit estimates the error of the first and second circuit voltage sensors, and calculates the optimum correction duty ratio such that makes the deviation between the passing current value and target value a minimum in the case of starting PWM control under this error. In addition, the control unit starts PWM control under the control duty ratio obtained by summing the base duty ratio and the optimum correction duty ratio, during activation of the voltage converter after the error of the first circuit voltage sensor and second circuit voltage sensor has been estimated by such a simulation arithmetic unit. Consequently, according to the present invention, so long as being after the error of the first and second circuit voltage sensors has been estimated by the simulation arithmetic unit, since it is possible to perform PWM control under the optimum duty ratio arrived at by considering the error of the first and second circuit voltage sensors, disturbance of the passing current can be further suppressed.

DETAILED DESCRIPTION OF THE INVENTION

First Embodiment

Figure 1:
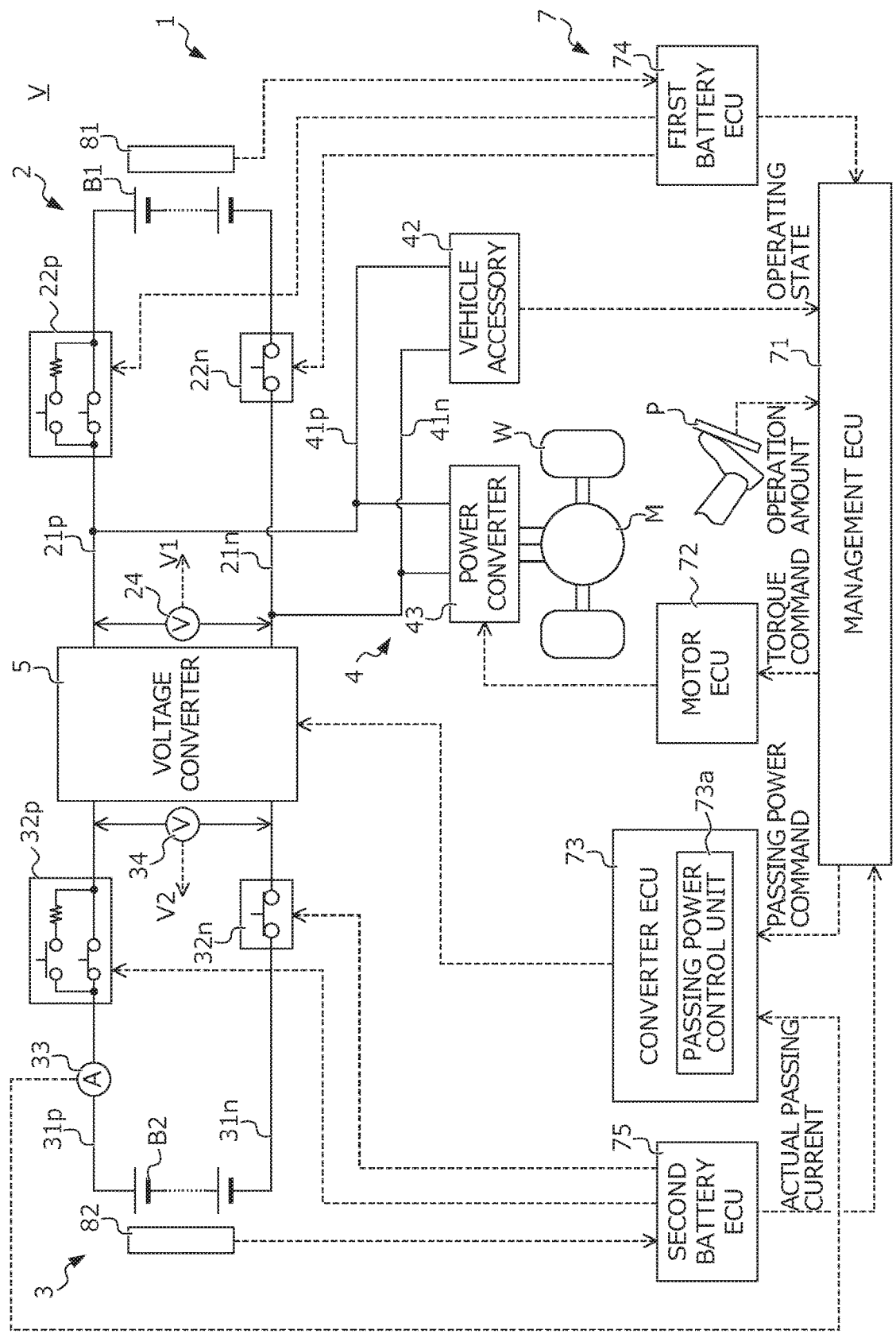
FIG. 1 is a view showing the configuration of a vehicle equipped with a power supply system according to a first embodiment of the present invention.

Hereinafter, a first embodiment of the present invention will be explained while referencing the drawings. FIG. 1 is a view showing the configuration of an electric vehicle V (hereinafter simply referred as "vehicle") equipped with a power supply system 1 according to the present embodiment.

The vehicle V includes: a drive wheel W; a drive motor M coupled to this drive wheel W; and a power supply system 1 which performs transfer of electric power between this drive motor M and the first battery B1 and second battery B2 described later. It should be noted that the present embodiment explains an example in which the vehicle V accelerates/decelerates by the electric power generated by the drive motor M mainly; however, the present invention is not limited thereto. The vehicle V may be established as a so-called hybrid vehicle equipped with the drive motor M and an engine as power generation sources. In addition, the present embodiment explains as an example the power supply system 1 which travels by supplying electric power stored in the two batteries B1, B2 to the drive motor M; however, the present invention is not limited thereto. Either of the two batteries B1, B2 equipped to the power supply system 1 may be established as a fuel cell.

The drive motor M is joined to the drive wheel W via a power transmission mechanism (not shown). The torque generated by the drive motor M by supplying three-phase alternating current power to the drive motor M from the power supply system 1 is transmitted to the drive wheel W via the power transmission mechanism (not shown) to cause the drive wheel W to rotate and the vehicle V to travel. In addition, the drive motor M exhibits a function of a generator during deceleration of the vehicle V and generates regenerative electric power, as well as applying regenerative braking torque according to the magnitude of this regenerative electric power to the drive wheel W. The regenerative electric power generated by the electric motor M is appropriately charged to the batteries B1, B2 of the power supply system 1.

The power supply system 1 includes: a first power circuit 2 having a first battery B1, a second power circuit 3 having a second battery B2, a voltage converter 5 which connects this first power circuit 2 and second power circuit 3, a load circuit 4 having various electrical loads including the drive motor M, and an electronic control unit group 7 which controls these power circuits 2, 3, 4 and voltage converter 5. The electronic control unit group 7 includes a management ECU 71, a motor ECU 72, a converter ECU 73, a first battery ECU 74, and a second battery ECU 75, which are each a computer.

The first battery B1 is a secondary battery capable of both discharging which converts chemical energy into electrical energy, and charging which converts the electrical energy into chemical energy. Hereinafter, a case is explained using a so-called lithium-ion battery which performs charging/discharging by the lithium ion migrating between electrodes as this first battery B1; however, the present invention is not limited thereto.

A first battery sensor unit 81 for estimating the internal state of the first battery B1 is provided to the first battery B1. The first battery sensor unit 81 detects a physical quantity required in order to acquire the charging rate of the battery B1 (value expressing the charged amount of the battery by percentage), the temperature, etc. in the first battery ECU 74, and is configured by a plurality of sensors which send signals according to the detection value to the first battery ECU 74. More specifically, the first battery sensor unit 81 is configured by a voltage sensor that detects the terminal voltage of the first battery B1, a current sensor that detects the electrical current flowing in the first battery B1, a temperature sensor that detects the temperature of the first battery B1, etc.

The second battery B2 is a secondary battery capable of both discharging that converts chemical energy into electrical energy, and charging that converts electrical energy into chemical energy. Hereinafter, a case is explained using a so-called lithium-ion battery which performs charging/discharging by the lithium ion migrating between electrodes as this second battery B2; however, the present invention is not limited thereto. The second battery B2 may use capacitors, for example.

A second battery sensor unit 82 for estimating the internal state of the second battery B2 is provided to the second battery B2. The second battery sensor unit 82 detects a physical quantity required for acquiring the charge rate, temperature, etc. of the second battery B2 in the second battery ECU 74, and is configured by a plurality of sensors which send signals according to the detection value to the second battery ECU 75. More specifically, the second battery sensor unit 82 is configured by a voltage sensor that detects terminal voltage of the second battery B2, a current sensor that detects the electrical current flowing in the second battery B2, a temperature sensor that detects the temperature of the second battery B2, etc.

Herein, the characteristics of the first battery B1 and the characteristics of the second battery B2 are compared. The first battery B1 has lower output weight density and higher energy weight density than the second battery B2. In addition, the first battery B1 has larger capacity than the second battery B2. In other words, the first battery B1 is superior to the second battery B2 in the point of energy weight density. It should be noted that energy weight density is the electric energy per unit weight (Wh/kg), and the output weight density is the power per unit weight (W/kg). Therefore, the first battery B1 which excels in the energy weight density is a capacitive battery with the main object of high capacity and the second battery B2 which excels in output weight density is an output-type battery with the main object of high output. For this reason, the power supply system 1 uses the first battery B1 as the main power source, and uses the second battery B2 as an auxiliary power source which supplements the first battery B1.

Figure 2:
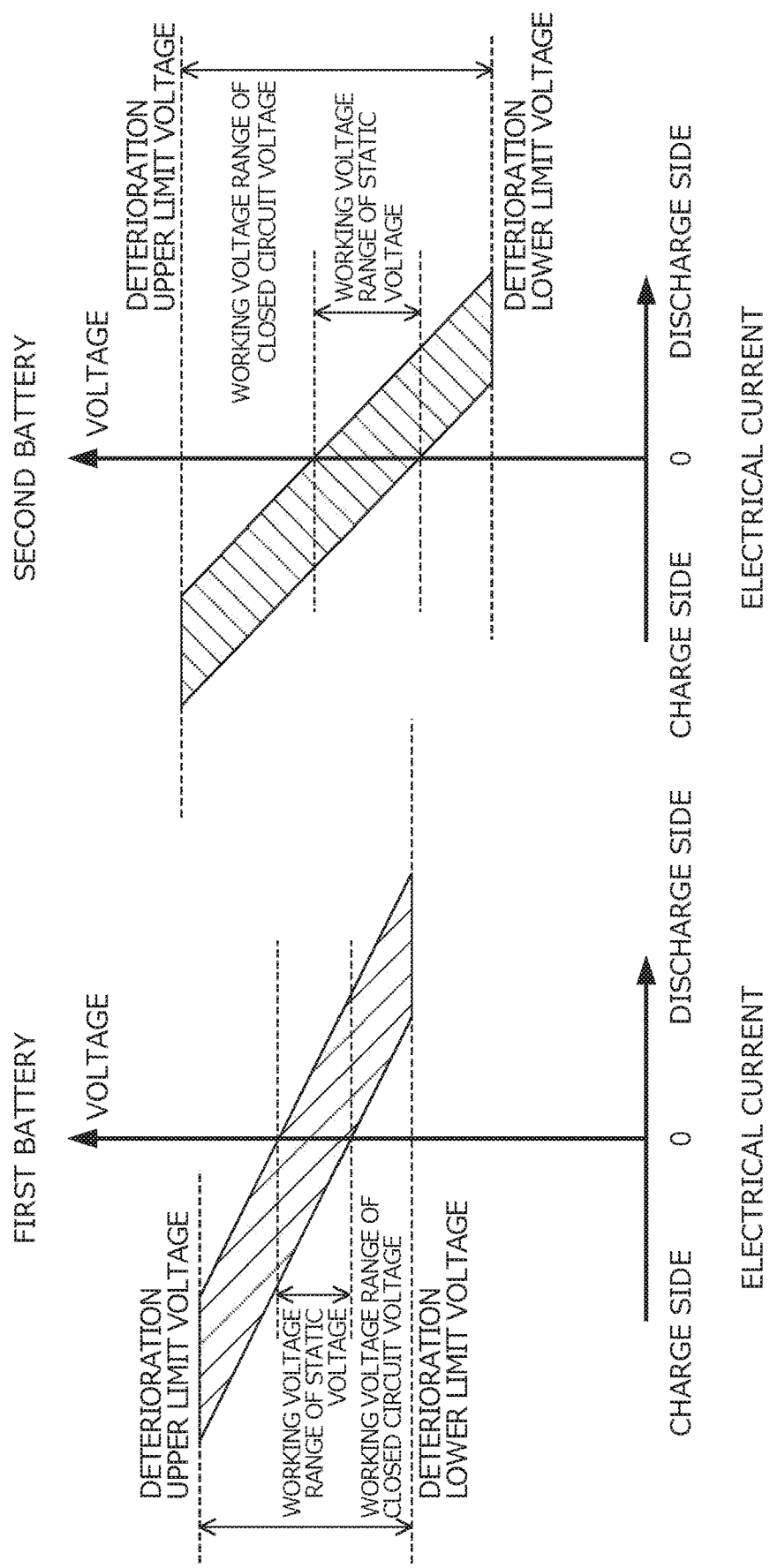
FIG. 2 provides graphs comparing the working voltage range of the first battery and second battery.

FIG. 2 provides graphs comparing the working voltage range of the first battery B1 and second battery B2 in the power supply system 1. In FIG. 2, the left side is a graph showing the working voltage range of the first battery B1, and the right side is a graph showing the working voltage range of the second battery B2. In FIG. 2, the horizontal axis shows the electrical current flowing in the battery, and the vertical axis shows the voltage of the battery.

As shown in FIG. 2, the static voltage of the batteries B1, B2 (i.e. voltage in a state in which electrical current is not flowing to the battery, referred to as open circuit voltage) has a characteristic of rising with higher charge rate. Therefore, the upper limit of the working voltage range relative to the static voltage of the batteries B1, B2 is the static voltage of each when the charge rate is the maximum value (e.g., 100%), and the lower limit is the static voltage of each when the charge rate is the minimum value (e.g., 0%). As shown in FIG. 2, the upper limit of the use voltage range relative to the static voltage of the second battery B2 is lower than the upper limit of the use voltage range relative to static voltage of the first battery B1. For this reason, the static voltage of the second battery B2 during travel of the vehicle V is basically maintained lower than the static voltage of the first battery B1.

As shown in FIG. 2, the closed circuit voltages of the batteries B1, B2 (i.e. voltage in a state in which electrical current is flowing to the battery) also have a characteristic of rising as the charge rate increases. In addition, since an internal resistance exists in the batteries B1, B2, this closed circuit voltage lowers from the static voltage as the discharge current increases, and rises from the static voltage as the charge current increases. Therefore, the upper limit of the working voltage range relative to the closed circuit voltage of the batteries B1, B2 is higher than the upper limit of the working voltage range relative to the static voltage of each, and the lower limit becomes lower than the lower limit of the working voltage range relative to the static voltage of each. In other words, the working voltage range relative to the closed circuit voltage of the batteries B1, B2 includes the working voltage range relative to the static voltage of each. As shown in FIG. 2, the working voltage range relative to the closed circuit voltage of the first battery B1 overlaps the working voltage range relative to the closed circuit voltage of the second battery B2.

In addition, since the deterioration of the batteries B1, B2 is accelerated when the charging current becomes too large, the upper limit of the working voltage range relative to the closed circuit voltage of these batteries B1, B2 is decided so that these batteries B1, B2 do not deteriorate. Hereinafter, the upper limit of the use range of the closed circuit voltage of these batteries B1, B2 is also referred to as deterioration upper limit voltage.

In addition, when the discharge current becomes too large, since deterioration of the batteries B1, B2 is accelerated, the lower limit of the working voltage range relative to the closed circuit voltage of these batteries B1, B2 is decided so that these batteries B1, B2 do not deteriorate. Hereinafter, the lower limit of the working voltage range relative to the closed circuit voltage of these batteries B1, B2 is also referred to as deterioration lower limit voltage.

Referring back to FIG. 1, the first output circuit 2 includes: the first battery B1, first power lines 21p, 21n which connect both positive and negative poles of this first battery B1 and the positive terminal and negative terminal on the high-voltage side of the voltage converter 5, a positive contactor 22p and negative contactor 22n provided to these first power lines 21p, 21n, and a first circuit voltage sensor 24 provided to the first power lines 21p, 21n.

The contactors 22p, 22n are normal open type which opens in a state in which a command signal from outside is not being inputted and breaks conduction between both electrodes of the first battery B1 and the first power lines 21p, 21n; and closes in a state in which a command signal is being inputted and connects the first battery B1 and first power lines 21p, 21n. These contactors 22p, 22n open/close according to a command signal transmitted from the first battery ECU 74. It should be noted that the positive contactor 22p is a pre-charge contactor having a precharge resistance for mitigating the inrush current to a plurality of smoothing capacitors provided to the first power circuit 2, load circuit 4, etc.

The first circuit voltage sensor 24 sends a detection signal according to the voltage of the first power circuit 2, i.e. value of the potential difference between the first power lines 21p, 21n, to the converter ECU 73. It should be noted that, in the present embodiment, the voltage of the first power circuit 2 is also referred to as first circuit voltage. In addition, the voltage value detected by the first circuit voltage sensor 24 is also referred to as first circuit voltage value V1.

The second power circuit 3 includes: the second battery B2, second power lines 31p, 32n which connect both positive and negative poles of this second battery B2 and the positive terminal and negative terminal on the low-voltage side of the voltage converter 5, a positive contactor 32p and negative contactor 32n provided to these second power lines 31p, 31n, a current sensor 33 provided to the second power line 31p, and a second circuit voltage sensor 34 provided to the second power lines 31p, 31n.

The contactors 32p, 32n are normal-open type which open in a state in which a command signal from outside is not being inputted to break conduction between both electrodes of the second battery 82 and the second power lines 31p, 31n, and close in a state in which a command signal is being inputted to connect between the second battery B2 and the second power lines 31p, 31n. These contactors 32p, 32n open/close in response to a command signal transmitted from the second battery ECU 75. It should be noted that the cathode contactor 32p is a pre-charge contactor having a pre-charge resistance for mitigating the inrush current to a plurality of smoothing capacitors provided to the first power circuit 2, load circuit 4, etc.

The electric current sensor 33 sends a detection signal according to a value of passing current, which is the electrical current flowing through the second power line 31p, i.e. electrical current flowing through the voltage converter 5, to the converter ECU 73. It should be noted that, in the present embodiment, the direction of passing current defines from the second power circuit 3 side to the first power circuit 2 side as positive, and defines from the first power circuit 2 side to the second power circuit 3 side as negative.

The second circuit voltage sensor 34 sends a detection signal according to the voltage of the second power circuit 3, i.e. value of the potential difference between the second power lines 31p, 31n, to the converter ECU 73. It should be noted that, in the present embodiment, the voltage of the second power circuit 3 is also referred to as second circuit voltage. In addition, the voltage value detected by the second circuit voltage sensor 34 is also referred to as second circuit voltage value V2.

The load circuit 4 includes: a vehicle accessory 42, output converter 43 to which the drive motor M is connected, and load power lines 41p, 41n which connect this vehicle accessory 42 and output converter 43 with the first power circuit 2.

The vehicle accessory 42 is configured by a plurality of electrical loads such as a battery heater, air compressor, DC/DC converter, and onboard charger. The vehicle accessory 42 is connected to the first power lines 21p, 21n of the first power circuit 2 by the load power lines 41p, 41n, and operates by consuming the electric power of the first power lines 21p, 21n. The information related to the operating state of various electrical loads constituting the vehicle accessory 42 is sent to the management ECU 71, for example.

The power converter 43 is connected to the first power lines 21p, 21n so as to be parallel with the vehicle accessory 42, by the load power lines 41p, 41n. The power converter 43 converts the electric power between the first power lines 21p, 21n and the drive motor M. The power converter 43, for example, is a PWM inverter according to pulse width modulation, provided with a bridge circuit configured by bridge connecting a plurality of switching elements (e.g., IGBT), and is equipped with a function of converting between DC power and AC power. The power converter 43 is connected to the first power lines 21p, 21n on the DC I/O side thereof, and is connected to each coil of the U phase, V phase and W phase of the drive motor M at the AC I/O side thereof. The power converter 43 converts the AC power of the first power lines 21p, 21n into three-phase AC power and supplies to the drive motor M, by ON/OFF driving the switching elements of each phase in accordance with a gate drive signal generated at a predetermined timing from a gate drive circuit (not shown) of the motor ECU 72, and converts the three-phase AC power supplied from the drive motor M into DC power and supplies to the first power lines 21p, 21n.

The voltage converter 5 connects the first power circuit 2 and second power circuit 3, and converts the voltage between both circuits 2, 3. A known boost circuit is used in this voltage converter 5.

Figure 3:
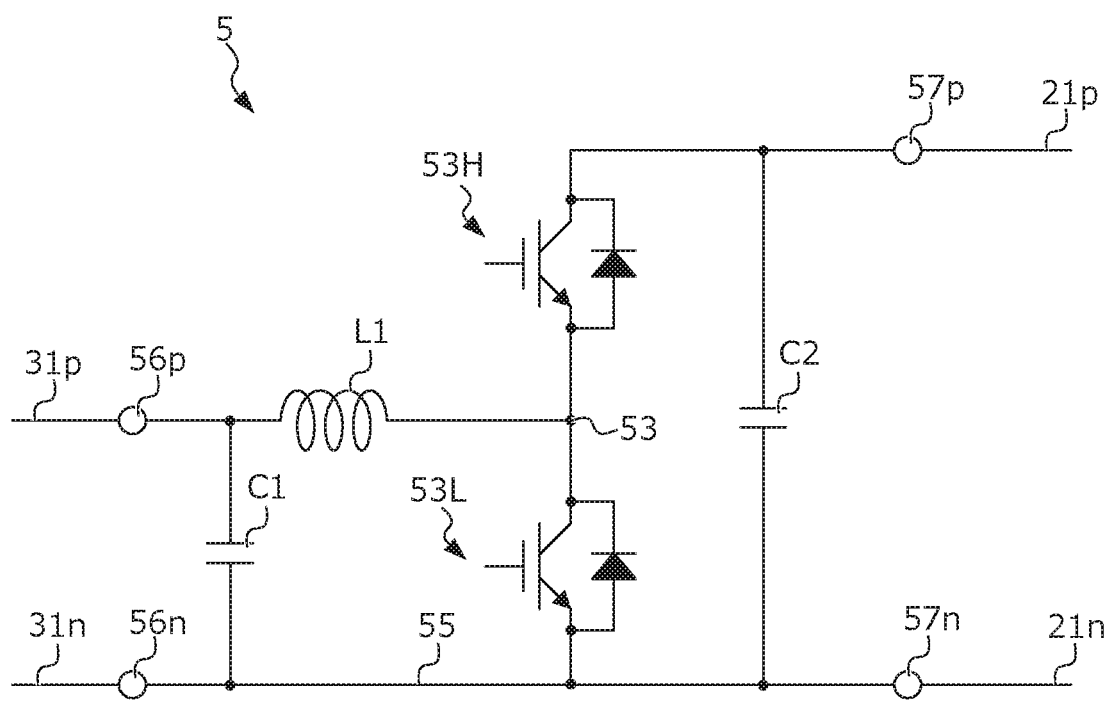
FIG. 3 is a view showing an example of the circuit configuration of a voltage converter.

FIG. 3 is a view showing an example of the circuit configuration of the voltage converter 5. The voltage converter 5 connects the first power lines 21p, 21n to which the first battery B1 is connected, and the second power lines 31p, 31n to which the second battery B2 is connected, and converts the voltage between these first power lines 21p, 21n and second power lines 31p, 31n. The voltage converter 5 is a DC/DC converter configured by combining a first smoothing capacitor C1, second smoothing capacitor C2, high-arm element 53H, low-arm element 53L, negative bus 55, low-voltage side terminals 56p, 56n, and high-voltage side terminals 57p, 57n.

The low-voltage side terminals 56p, 56n are connected to the second power lines 31p, 31n, and the high-voltage side terminals 57p, 57n are connected to the first power line 21p, 21n. The negative bus 55 is wiring connecting the low-voltage side terminal 56n and high-voltage side terminal 57n.

A reactor L has one end side thereof connected to the low-voltage side terminal 56p, and the other end side connected to a connection node 53 between the high-arm element 53H and low-arm element 53L. The first smoothing capacitor C1 has one end side thereof connected to the low-voltage side terminal 56p, and the other end side connected to the low-voltage side terminal 56n. The second smoothing capacitor C2 has one end side thereof connected to the high-voltage side terminal 57p, and the other end side thereof connected to the high-voltage side terminal 57n.

The high-arm element 53H and low-arm element 53L each include a well-known power switching element such as IGBT or MOSFET, and a freewheeling diode connected to this power switching element. This high-arm element 53H and low-arm element 53L are connected in this order in series between the high-voltage side terminal 57p and negative bus 55.

A collector of the power switching element of the high-arm element 53H is connected to the high-voltage side terminal 57p, and the emitter thereof is connected to the collector of the low-arm element 53L. The emitter of the power switching element of the low-arm element 53L is connected to the negative bus 55. The forward direction of the freewheeling diode provided to the high-arm element 53H is a direction from the reactor L towards the high-voltage side terminal 57p. In addition, the forward direction of the freewheeling diode provided to the low-arm element 53L is a direction from the negative bus 55 towards the reactor L.

The voltage converter 5 converts the voltage between the first power lines 21p, 21n and the second power lines 31p, 31n, by alternately driving ON/OFF the high-arm element 53H and low-arm element 53L, following the gate drive signal generated at a predetermined timing from a gate drive circuit (not shown) of the converter ECU 73.

As explained by referencing FIG. 2, the static voltage of the second battery B2 during travel of the vehicle V is basically maintained lower than the static voltage of the first battery B1. Therefore, the voltage of the first power lines 21p, 21n is basically higher than the voltage of the second power lines 31p, 31n. Therefore, the converter ECU 73, in a case of driving the drive motor M using both the power outputted from the first battery B1 and the power outputted from the second battery B2, operates the voltage converter 5 so that a boost function is exhibited in the voltage converter 5. Boost function refers to a function of stepping up the power of the second power lines 31p, 31n to which the low-voltage side terminals 56p, 56n are connected, and outputting to the first power lines 21p, 21n to which the high-voltage side terminals 57p, 57n are connected, whereby positive passing current flows from the second power lines 31p, 31n side to the first power lines 21p, 21n side. In addition, in the case of suppressing discharge of the second battery B2, and driving the drive motor M with only the power outputted from the first battery B1, the converter ECU 73 is configured so as to turn OFF the voltage converter 5, and make so that electrical current does not flow from the first power lines 21p, 21n to the second power lines 31p, 31n. However, in this case, in the case of the voltage of the second power lines 31p, 31n becoming higher than the voltage of the first power lines 21p, 21n, the second battery B2 turns to discharge, and positive passing current may flow from the second power lines 31p, 31n to the first power lines 21p, 21n via the freewheeling diode of the high-arm element 53H.

In addition, in the case of charging the first battery B1 or second battery B2 by the regenerative electric power outputted from the drive motor M to the first power lines 21p, 21n during deceleration, the converter ECU 73 operates the voltage converter 5 so as to exhibit a step-down function in the voltage converter 5. Step-down function refers to a function of stepping down the electric power in the first power lines 21p, 21n to which the high-voltage side terminals 57p, 57n are connected, and outputting to the second power lines 31p, 31n to which the low-voltage side terminals 56p, 56n are connected, whereby negative passing current flows from the first power lines 21p, 21n side to the second power lines 31p, 31n side.

Referring back to FIG. 1, the first battery ECU 74 is a computer mainly handling state monitoring of the first battery B1 and the ON/OFF operation of the contactors 22p, 22n of the first power circuit 2. The first battery ECU 74, based on a known algorithm using the detection value sent from the first battery sensor unit 81, calculates various parameters representing the internal state of the first battery B1, more specifically, the temperature of the first battery B1, internal resistance of the first battery B1, static voltage of the first battery B1, open-circuit voltage of the first battery B1, charge rate of the first battery B1, etc. The information related to the parameters representing the internal state of the first battery B1 acquired in the first battery ECU 74 is sent to the management ECU 71, for example.

The second battery ECU 75 is a computer mainly handling state monitoring of the second battery B2 and open/close operation of the contactors 32p, 32n of the second power circuit 3. The second battery ECU 75, based on a known algorithm using the detection value sent from the second battery sensor unit 82, calculates various parameters representing the internal state of the second battery B2, more specifically, the temperature of the second battery B2, internal resistance of the second battery B2, static voltage of the second battery B2, closed-circuit voltage of the second battery B2, charge rate of the second battery B2, etc. The information related to the parameters representing the internal state of the second battery B2 acquired in the second battery ECU 74 is sent to the management ECU 71, for example.

The management ECU 71 is a computer managing mainly the flow of electric power in the overall power supply system 1. The management ECU 71 generates, according to the following sequence, a torque command signal corresponding to a command related to the torque generated by the drive motor M, and a passing power command signal corresponding to a command related to electric power passing through the voltage converter 5.

The management ECU 71, based on the operation amount of pedals such as the accelerator pedal and brake pedal by the driver, calculates the demanded drive torque by the driver, and sends a torque command signal according to this demanded drive torque to the motor ECU 72.

The management ECU 71 calculates a total demanded power, which is the electric power demanded in the load circuit 4 overall, by summing the demanded accessory power, which is the electric power demanded in the vehicle accessory 42, and the demanded drive power, which is the electric power demanded in the drive motor M. Herein, the demanded accessory power is calculated in the management ECU 71, based on information related to the operating state of various electrical loads sent from the vehicle accessory 42. In addition, the demanded drive power is calculated in the management ECU 71, by converting the aforementioned demanded drive torque into electric power.

The management ECU 71 calculates a second load rate corresponding to a proportion of electric power outputted from the second battery B2 relative to the total demanded power, using information related to the internal state of the first battery B1 sent from the first battery ECU 74, information related to the internal state of the second battery B2 sent from the second battery ECU 75, and the aforementioned demanded drive power. In addition, the management ECU 71 calculates the second target power, which is the target relative to the electric power outputted from the second battery B2 by multiplying the second load rate calculated in the above way by the total demanded power, and sends the passing power command signal according to this second target power to the converter ECU 73.

The motor ECU 72 is a computer that mainly manages the flow of electric power from the first power circuit 2 to the drive motor M. The motor ECU 72, based on the torque command signal sent from the management ECU 71, operates the power converter 43 so that a torque according to this command is generated in the drive motor M. The electric power according to the demanded drive power is thereby supplied from the first power circuit 2 to the drive motor M.

The converter ECU 73 is a computer configured by a passing power control unit 73a that is a control module handling management of electric power passing through the voltage converter 5.

The passing power control unit 73a, in response to a passing power command signal sent from the management ECU 71, operates the high-arm element 53H and low-arm element 53L of the voltage converter 5 by way of PWM control, so that the passing power according to a command passes through the voltage converter 5.

More specifically, the passing power control unit 73a activates the voltage converter 5 by starting PWM control of the voltage converter 5 in accordance with the sequence explained by referencing FIG. 7 later, in response to an activation request of the voltage converter 5 being produced.

In addition, after activation of the voltage converter 5 completes, the passing power control unit 73a, based on the passing power command signal, calculates the target current, which is the target relative to the passing current of the voltage converter 5, and decides the duty ratio in accordance with a known feedback control algorithm so that the passing current detected by the current sensor 33 becomes the target current, and inputs a gate drive signal generated under this duty ratio to the high-arm element 53H and low-arm element 53L of the voltage converter 5. The electric power according to the second target power is thereby outputted from the second battery B2 to the first power circuit 2. In addition, a deficit by subtracting the second target power from the total demanded power is outputted from the first battery B1.

In addition, the passing power control unit 73a includes an overcurrent protection function. In other words, the passing power control unit 73a, while performing PWM control of the voltage converter 5 in the above way, ends PWM control which is in execution in order to protect the various electrical components provided to the voltage converter 5, first power circuit 2, second power circuit 3 and load circuit 4 from overcurrent in the case of the passing current detected by the current sensor 33 exceeding a predetermined protection range, and makes so that electrical current does not flow between the first power circuit 2 and second power circuit 3.

Figure 4:
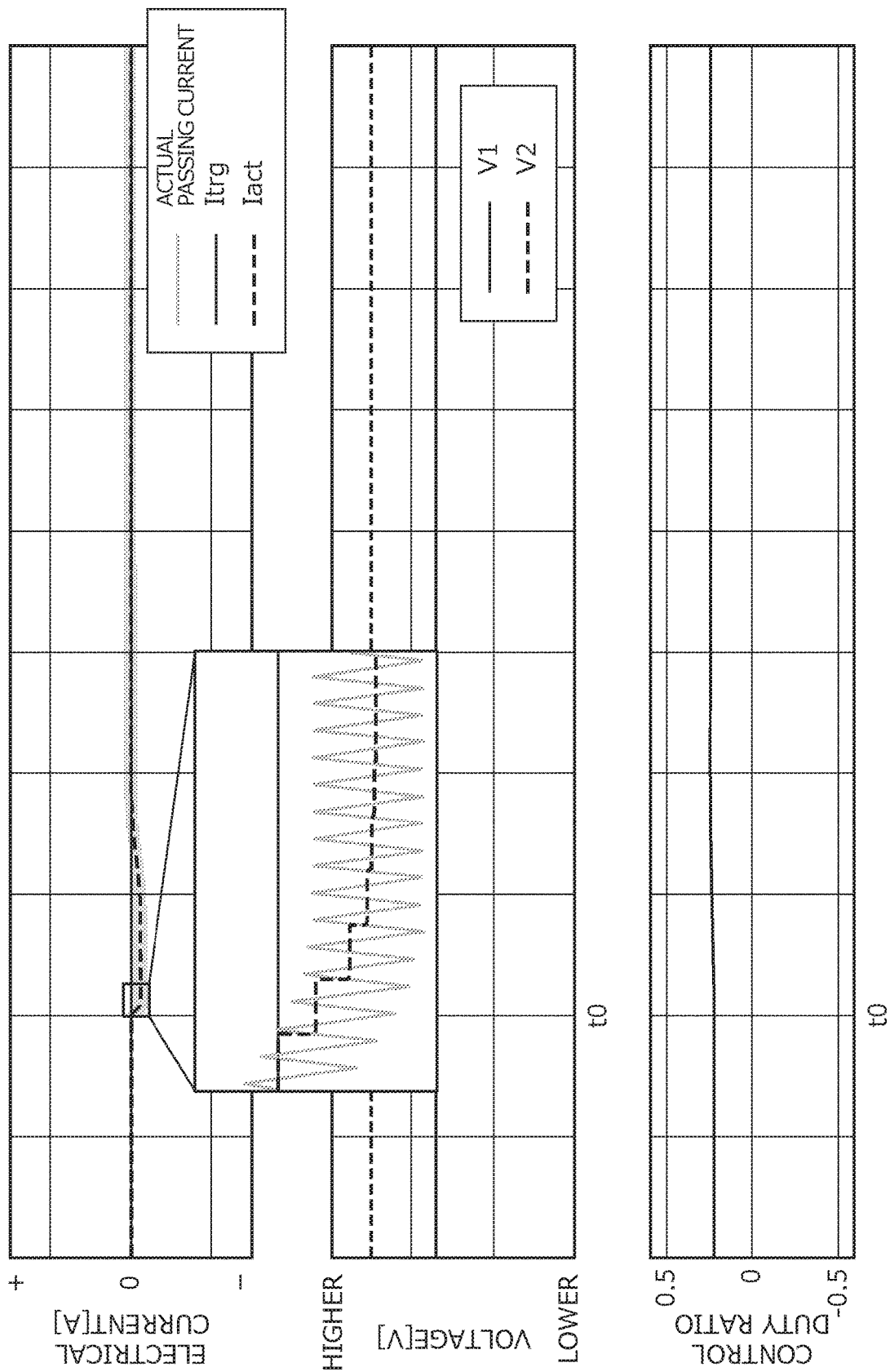
FIG. 4 provides graphs reproducing the time changes in electrical current, voltage and control duty ratio in a case of activating the voltage converter according to conventional activation processing, by simulation (error is about 0)
Figure 5:
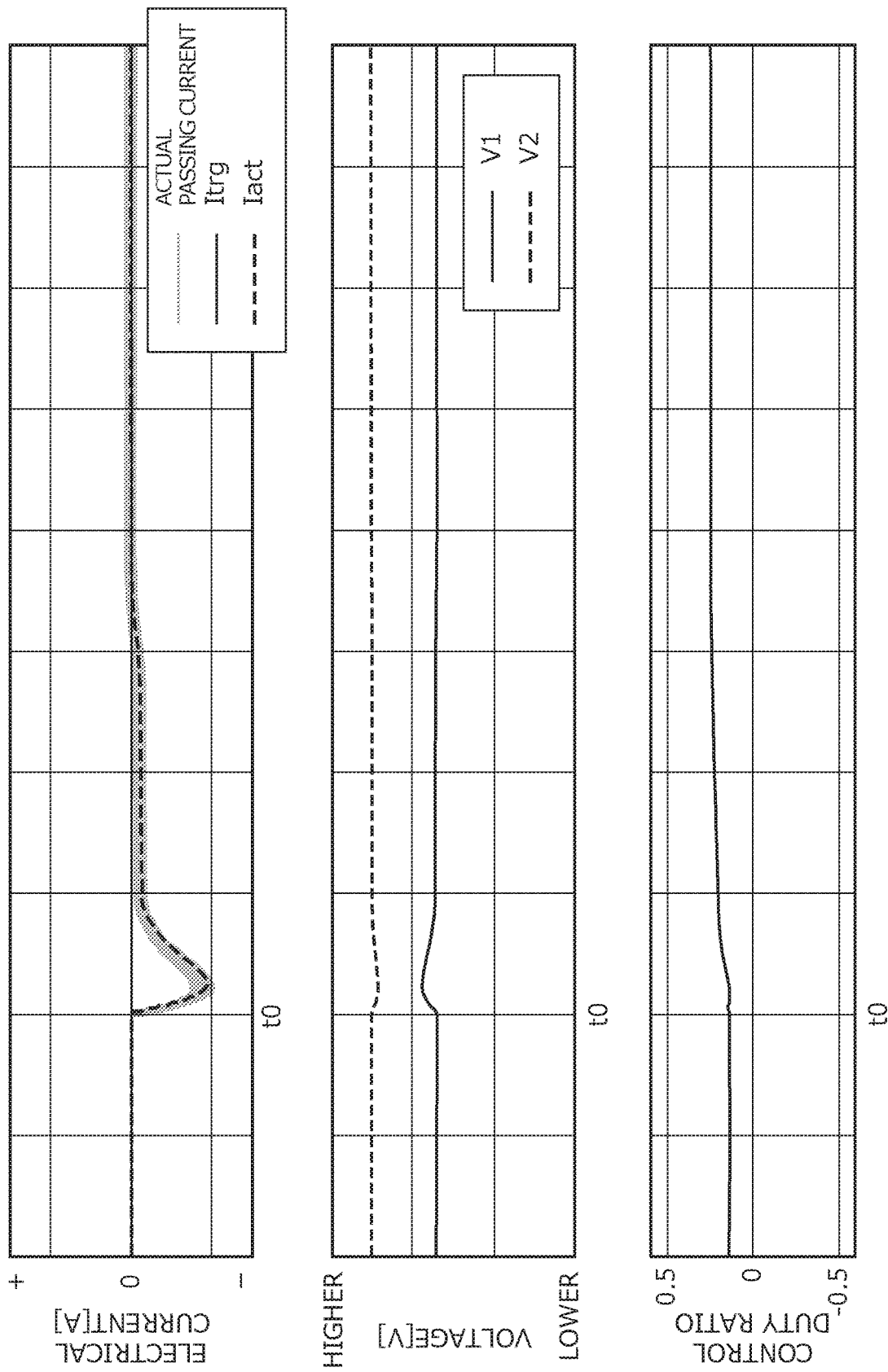
FIG. 5 provides graphs reproducing the time changes in electrical current, voltage and control duty ratio in a case of activating the voltage converter according to conventional activation processing, by simulation (offset error only in second circuit voltage sensor)
Figure 6:
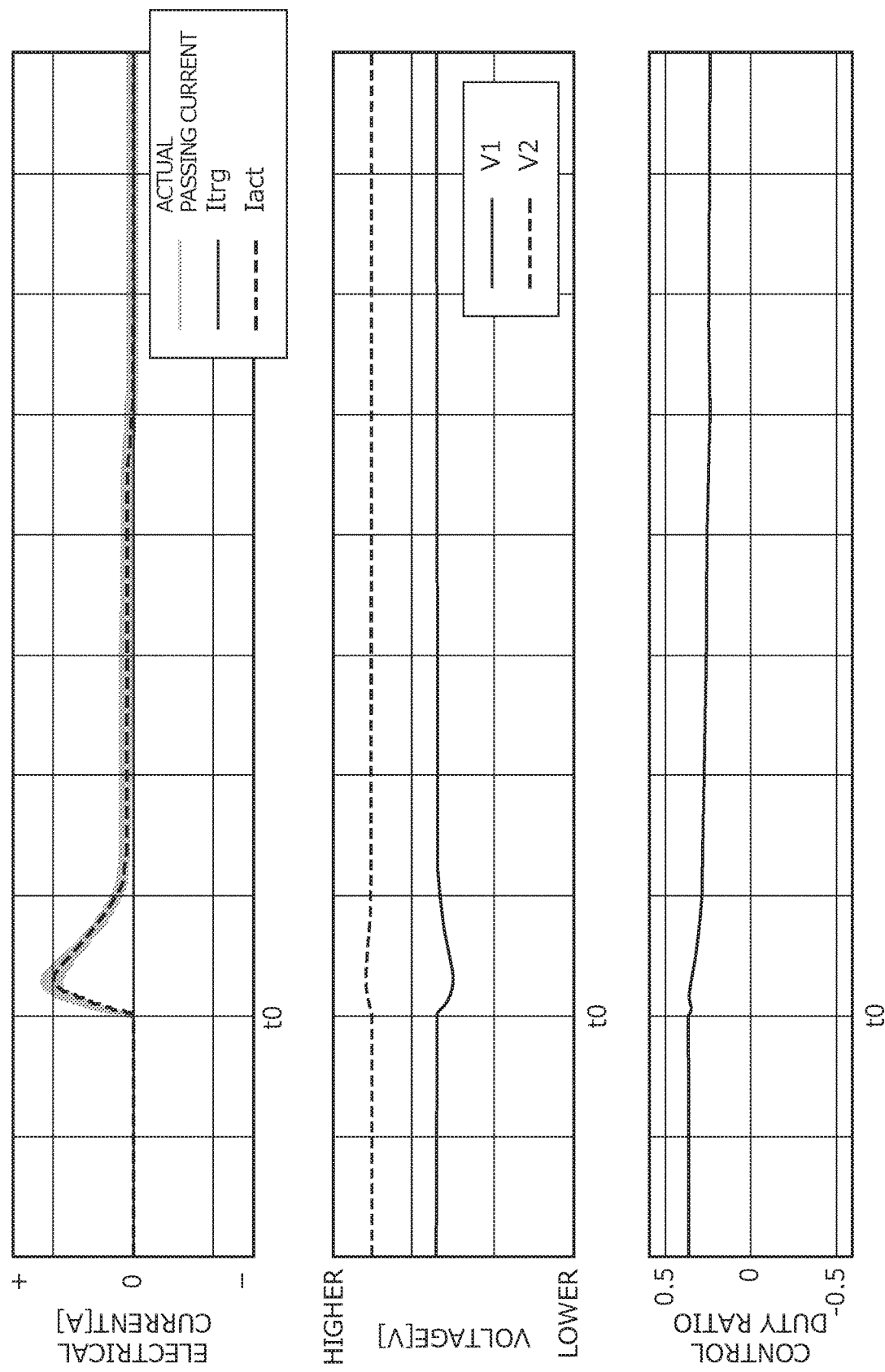
FIG. 6 provides graphs reproducing the time changes in electrical current, voltage and control duty ratio in a case of activating the voltage converter according to conventional activation processing, by simulation (offset error in both first circuit voltage sensor and second circuit voltage sensor)

Herein, the problem arising during activation of the voltage converter 5 will be explained while referencing the simulation results of FIGS. 4 to 6. FIGS. 4 to 6 provide graphs reproducing the time changes of electrical current (topmost), voltage (middle) and control duty ratio (bottommost) in a case of activating the voltage converter 5 according to conventional activation processing, by simulation. Herein, conventional activation processing refers to activating the voltage converter 5 by performing PWM control under the control duty ratio (more specifically base duty ratio described later) decided based on the first circuit voltage value V1 detected by the first circuit voltage sensor 24 and the second circuit voltage value V2 detected by the second circuit voltage sensor 34, so that the passing current value Iact detected by the current sensor 33 becomes the activation target value Itrg.

FIG. 4 shows a case of performing simulation under the conditions such as the error of the first circuit voltage sensor 24 and error of the second circuit voltage sensor 34 being almost 0. As shown in FIG. 4, when starting PWM control at time t0, the passing current value Iact is slightly disturbed so as to move away from the activation target value Itrg to the negative side; however, it mostly converges after a while. This is considered to be caused by PWM dead time and slight error existing in the respective voltage sensors 24, 34. In addition, as shown by enlarging part of FIG. 4, the actual passing current greatly oscillates every time turning ON/OFF the high-arm element 53H and low-arm element 53L under the control duty ratio.

FIG. 5 shows a case of performing simulation under conditions of the error of the first circuit voltage sensor 24 being almost 0, but there being offset error on the order of several tens (V) to the positive side in the second circuit voltage sensor 34. If such offset error exists in the second circuit voltage sensor 34, the control duty ratio decided based on the second circuit voltage value V2 including such offset error becomes somewhat smaller than the optimum duty ratio such that the value of current deviation between the passing current value Iact and activation target value Itrg (Iact−Itrg) becomes a minimum. For this reason, as shown in FIG. 5, when starting the PWM control at time t0, the passing current value Iact is greatly disturbed so as to move away from the activation target value Itrg to the negative side. For this reason, with the conventional activation processing, immediately after activation of the voltage converter 5, although being a very short time and not being of an extent exceeding the above-mentioned protection range, relatively large passing current flows from the first power circuit 2 side to the second power circuit 3 side, and noise and loss may occur.

In addition, FIG. 6 shows a case of performing simulation under conditions of there being offset error on the order of several tens (V) to the positive side in the first circuit voltage sensor 24, and there being offset error on the order of several tens (V) to the negative side in the second circuit voltage sensor 34. When such offset error exists in the first circuit voltage sensor 24 and second circuit voltage sensor 34, the control duty ratio decided based on the first circuit voltage value V1 and second circuit voltage value V2 which include such offset error becomes somewhat larger than the optimum duty ratio such that the value of current deviation between the passing current value Iact and activation target value Itrg (Iact−Itrg) becomes a minimum. For this reason, as shown in FIG. 6, when starting PWM control at time t0, the passing current value Iact is greatly disturbed so as to move away from the activation target value Itrg to the positive side. For this reason, with the conventional activation processing, immediately after activation of the voltage converter 5, although being a very short time and not being of an extent exceeding the above-mentioned protection range, relatively large passing current flows from the second power circuit 3 side to the first power circuit 2 side, and noise and loss may occur.

In the above way, when starting PWM control in a state in which there is error in the voltage sensors 24, 34 with the conventional activation processing, there is concern over the passing current being disturbed immediately after, and the quality declining.

Figure 7:
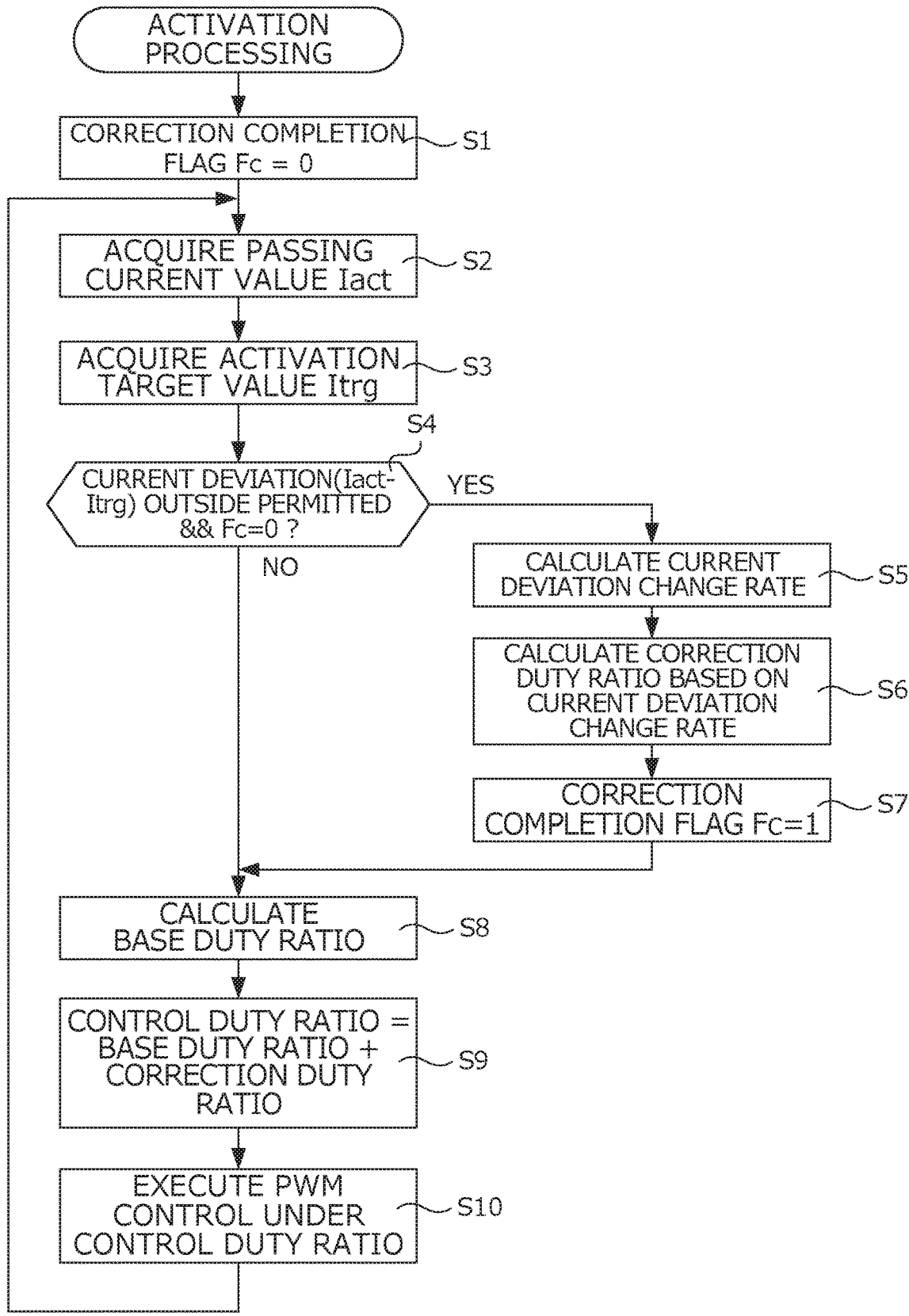
FIG. 7 is a flowchart showing the specific sequence of activation processing of the voltage converter.

FIG. 7 is a flowchart showing the specific sequence of activation processing of the voltage converter 5 in the passing power control unit 73a. The activation processing shown in FIG. 7 is repeatedly performed in a state in which the voltage converter 5 is stopped (state in which the high-arm element 53H and low-arm element 53L are both OFF), until activation of the voltage converter 5 completes under a predetermined control cycle by the passing power control unit 73a, in response to an activation request of the voltage converter 5 being produced.

First, in Step S1, the passing power control unit 73a resets the value of a correction completion flag Fc, in response to starting activation processing, and then the processing advances to Step S2. This correction completion flag Fc is a flag for elucidating having already performed one time the processing of calculating a correction duty ratio described later (refer to Step S6 described later), from when starting the activation processing of FIG. 4 until stopping the voltage converter 5.

In Step S2, the passing power control unit 73a acquires the passing current value Iact, and then the processing advances to Step S3. In Step S3, the passing power control unit 73a acquires the activation target value Itrg, which corresponds to the target value for the passing current value Iact during activation of the voltage converter 5, and then the processing advances to Step S4. Although the specific value of the activation target value Itrg is defined as 0 below, for example, the present invention is not limited thereto.

In Step S4, the passing power control unit 73a calculates the value of current deviation between the passing current value Iact and activation target value Itrg (Iact−Itrg), and determines whether the value of this current deviation is outside a predetermined permitted range, and the value of the correction completion flag Fc is 0. Herein, the permitted range is set so as to be included within the aforementioned protection range set for overcurrent protection, and centered around the activation target value Itrg.

In the case of the determination result of Step S4 being NO, i.e. in the case of the value of current deviation (Iact−Itrg) being within the permitted range, or already performing once the processing of calculating the correction duty ratio, the passing power control unit 73a advances the processing to Step S8.

In Step S8, the passing power control unit 73a calculates the base duty ratio so that the passing current value Iact becomes the activation target value Itrg, and then advances the processing to Step S9. More specifically, the passing power control unit 73a calculates the base duty ratio by summing a theoretical value calculated theoretically based on the activation target value Itrg, first circuit voltage value V1 detected by the first circuit voltage sensor 24 and second circuit voltage value V2 detected by the second circuit voltage sensor 34, and a feedback correction value calculated so that the value of this current deviation becomes 0, according to a known feedback control rule based on the value of the current deviation (Iact−Itrg). Herein, theoretical value is set so that the potential difference of the second circuit voltage value V2 and the voltage of a connection node 53 (refer to FIG. 3) controlled by PWM control are equal, in a case of defining the activation target value Itrg as 0, for example. In addition, the voltage of the connection node 53 is expressed by the product of the first circuit voltage value V1 and the duty ratio; therefore, the theoretical value is V2/V1.

In Step S9, the passing power control unit 73a calculates the control duty ratio, by summing the base duty ratio and the correction duty ratio described later, and then advances the processing to Step S10. In Step S10, the passing power control unit 73a performs PWM control of the voltage converter 5 under the control duty ratio calculated in Step S9, alternately turns ON/OFF the high-arm element 53H and low-arm element 53L, and then returns the processing to Step S2.

Herein, the correction duty ratio is calculated first in Step S6 described later. Therefore, the correction duty ratio is 0 immediately after starting the activation processing. For this reason, the passing power control unit 73a performs PWM control of the voltage converter 5 under the base duty ratio, from after starting activation processing of FIG. 4 until the determination result of Step S4 becomes YES.

In addition, in the case of the determination result of Step S4 being YES, i.e. case of the value of the current deviation (Iact−Itrg) being outside the permitted range and not yet performing the processing of calculating the correction duty ratio, the passing power control unit 73a advances the processing to Step S5.

In Step S5, the passing power control unit 73a calculates a current deviation change rate, which is a change rate of the value of the current deviation from after starting activation processing, i.e. after starting PWM control under the base duty ratio, until the value of the current deviation exceeds the permitted range. More specifically, the passing power control unit 73a calculates the current deviation change rate by dividing the current change width calculated by subtracting the value of the current deviation immediately after starting activation processing from the value of the current deviation when first determined that the value of the current deviation became outside the permitted range in Step S4, by the time elapsed from starting activation processing until first determining that the value of the current deviation became outside the permitted range in Step S4.

In Step S6, the passing power control unit 73a calculates a correction duty ratio such that reduces the value of the current deviation, based on the current deviation change rate calculated in Step S5, and then advances the processing to Step S7. More specifically, the passing power control unit 73a includes a correlating means which correlates the current deviation change rate generated in a case of activating the voltage converter 5 under the base duty ratio, with the correction duty ratio such that reduces the value of this current deviation, and calculates the correction duty ratio such that reduces the value of current deviation by inputting the current deviation change rate calculated in Step S5 into this correlating means. As a specific example of a correlating means, a control map, a formula, a neural network or the like can be exemplified.

As explained by referencing FIGS. 4 to 6, the current deviation change rate immediately after starting PWM control is correlated with the magnitude of error of the first circuit voltage sensor 24 and second circuit voltage sensor 34. Therefore, with only this current deviation change rate, it is not possible to estimate so far as what magnitude of error specifically exists in the first circuit voltage sensor 24 and second circuit voltage sensor 34. Therefore, the above-mentioned correlating means is set so that a correction duty ratio such that reduces the value of the current deviation on average irrespective of the generating factor of the error is outputted, by performing simulation a number of times in advance while varying the generating factor of error.

In Step S7, in response to one time of the arithmetic processing of the correction duty ratio ending, the passing power control unit 73a sets the value of the correction completion flag Fc elucidating this to "1", and then advances the processing to Step S8.

In the above way, the passing power control unit 73a, in a case of the value of the current deviation exceeding the permitted range after starting PWM control under the base duty ratio during activation of the voltage converter 5, performs PWM control under a duty ratio obtained by summing the correction duty ratio calculated based on the current deviation change rate and the base duty ratio.

Figure 8:
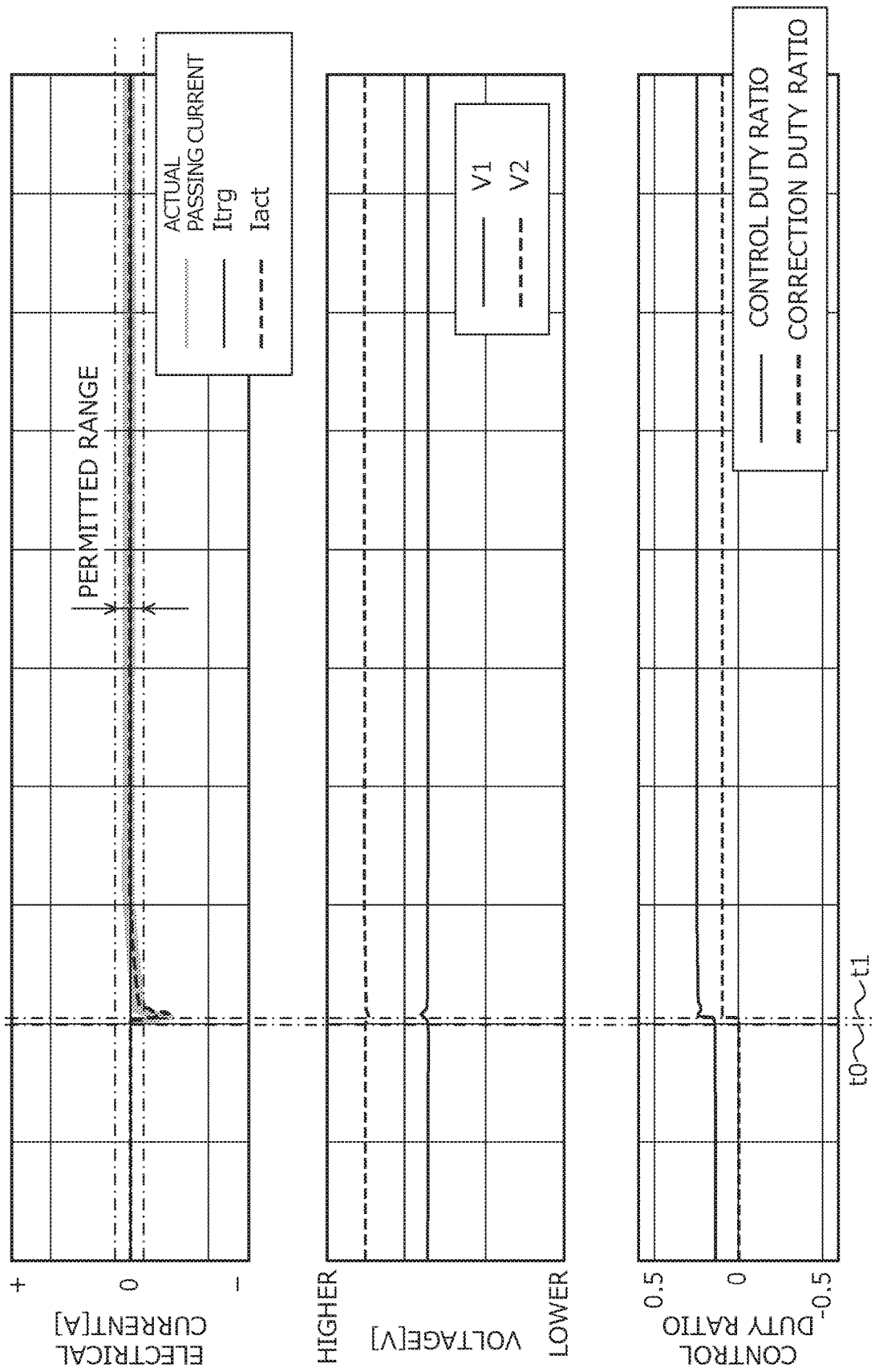
FIG. 8 provides graphs reproducing the time changes in electrical current, voltage and control duty ratio in a case of activating the voltage converter according to the activation processing of FIG. 7, by simulation (offset error only in second circuit voltage sensor)
Figure 9:
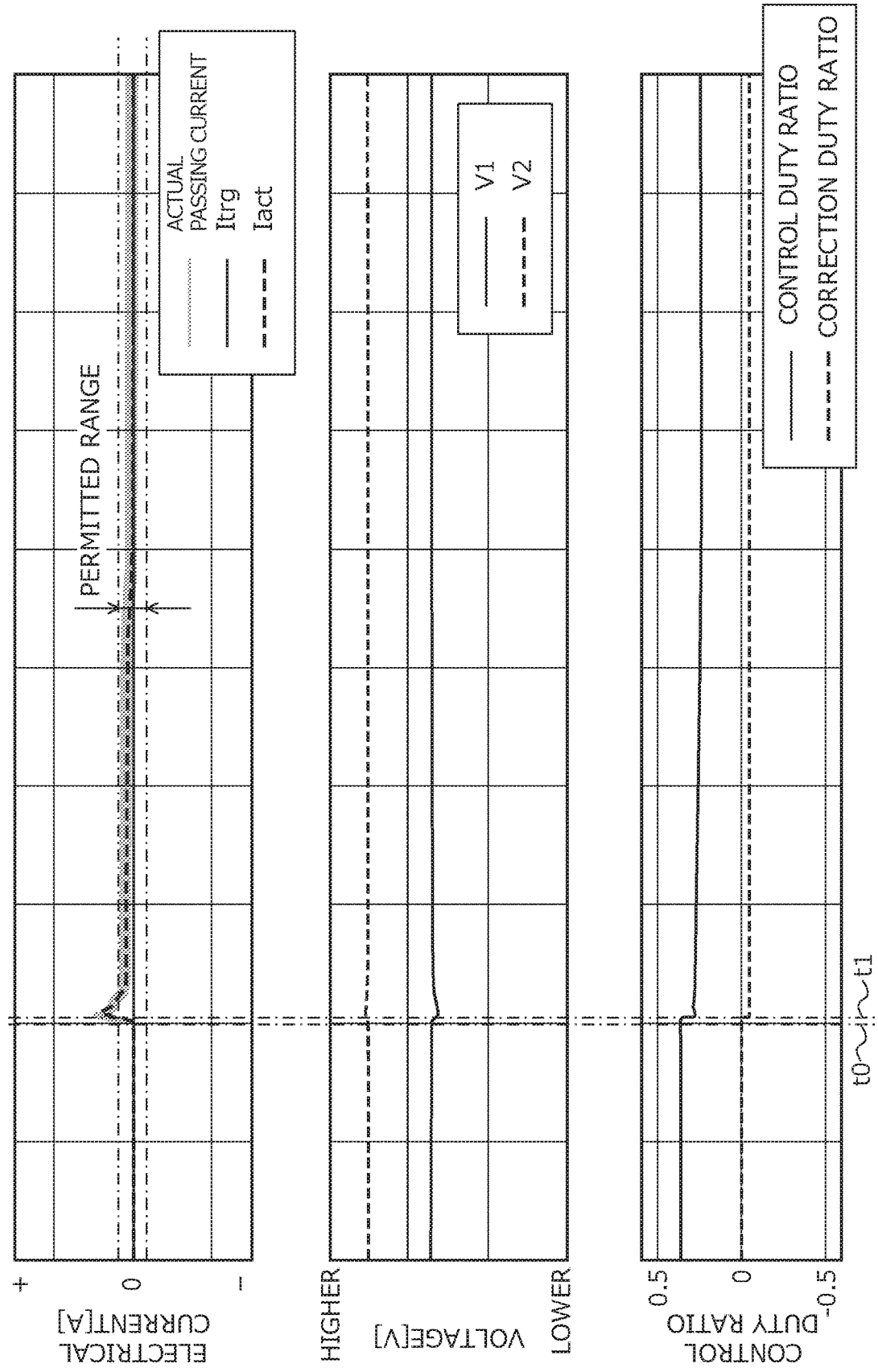
FIG. 9 provides graphs reproducing the time changes in electrical current, voltage and control duty ratio in a case of activating the voltage converter according to the activation processing of FIG. 7, by simulation (offset error in both first circuit voltage sensor and second circuit voltage sensor)

Next, the effects of activation processing of FIG. 7 will be explained while referencing the simulation results of FIGS. 8 and 9. FIGS. 8 and 9 provide graphs reproducing the time change of electrical current (topmost), voltage (middle) and control duty ratio (bottommost) in a case of activating the voltage converter 5 according to the activation processing of FIG. 7, by simulation.

FIG. 8 shows a case of performing simulation under the same error conditions as FIG. 5, i.e. conditions of the error of the first circuit voltage sensor 24 being almost 0, but there being offset error on the order of several tens (V) to the positive side in the second circuit voltage sensor 34. As explained by referencing FIG. 5, the base duty ratio decided based on the first circuit voltage value V1 and second circuit voltage value V2 including such offset error is somewhat smaller than the optimum duty ratio such that the value of the current deviation between the passing current value Iact and activation target value Itrg becomes a minimum. For this reason, when starting PWM control under the base duty ratio at time t0, the passing current value Iact moves away from the activation target value Itrg to the negative side.

Subsequently, at time t1, the passing power control unit 73a determines that the value of the current deviation (Iact−Itrg) is no more than the lower limit value of the permitted range (refer to Step S4), calculates the current deviation change rate from time t0 until t1 in response thereto (refer to Step S5), and calculates the correction duty ratio based on this current deviation change rate (refer to Step S6). For this reason, the control duty ratio at time t1 increases discontinuously by the amount of the correction duty ratio. Then, following this time t1, the passing power control unit 73a continuously executes PWM control under the control duty ratio obtained by summing the base duty ratio and the correction duty ratio. Following time t1, the passing current value Iact thereby suddenly changes so as to approach the activation target value Itrg. By activating the voltage converter 5 under the activation processing of FIG. 7 in the above way, it is possible to suppress disturbance of the electrical current which occurred in the example of FIG. 5.

FIG. 9 shows a case of performing simulation under the same error conditions as FIG. 6, i.e. conditions of there being offset error on the order of several tens (V) to the positive side in the first circuit voltage sensor 24, and there being offset error on the order of several tens (V) to the negative side in the second circuit voltage sensor 34. As explained by referencing FIG. 6, the base duty ratio decided based on the first circuit voltage value V1 and second circuit voltage value V2 including such offset error is somewhat larger than the optimum duty ratio such that the value of the current deviation between the passing current value Iact and activation target value Itrg becomes a minimum. For this reason, when starting PWM control under the base duty ratio at time t0, the passing current value Iact moves away from the activation target value Itrg to the positive side.

Subsequently, at time t1, the passing power control unit 73a determines that the value of the current deviation (Iact−Itrg) is at least the upper limit value of the permitted range (refer to Step S4), calculates the current deviation change rate from time t0 until t1 in response thereto (refer to Step S5), and calculates the correction duty ratio based on this current deviation change rate (refer to Step S). For this reason, the control duty ratio at time t1 decreases discontinuously by the amount of the correction duty ratio. Then, following this time t1, the passing power control unit 73a continuously executes PWM control under the control duty ratio obtained by summing the base duty ratio and the correction duty ratio. Following time t1, the passing current value Iact thereby suddenly changes so as to approach the activation target value Itrg. By activating the voltage converter 5 under the activation processing of FIG. 7 in the above way, it is possible to suppress disturbance of the electrical current which occurred in the example of FIG. 6.

According to the power supply system 1 according to the above such present embodiment, the following effects are exerted.

(1) The power supply system 1 includes the first power circuit 2 having the first battery B1, second power circuit 3 having the second battery B2, voltage converter 5 which converts voltages between these circuits 2, 3, and passing power control unit 73a which operates this voltage converter 5 according to PWM control. The passing power control unit 73a decides a base duty ratio such that the passing current value Iact becomes the activation target value Itrg based on the first circuit voltage value V1 and second circuit voltage value V2 acquired by the first and second circuit voltage sensors 24, 34 during activation of the voltage converter 5, and starts PWM control under this base duty ratio. At this time, if there is error in the voltage sensors 24, 34, the passing current value Iact will deviate from the activation target value Itrg, and the value of the current deviation between the passing current value Iact and activation target value Itrg may exceed the permitted range. Therefore, in a case of starting PWM control under the base duty ratio, and then the value of the current deviation exceeding the permitted range, the passing power control unit 73a calculates a correction duty ratio based on the value of the current deviation, and performs PWM control under a control duty ratio obtained by summing this correction duty ratio and base duty ratio. According to the power supply system 1, it is thereby possible to activate the voltage converter 5, while suppressing the passing current from being disturbed to greatly exceed the permitted range.

(2) The passing power control unit 73a ends PWM control which is being executed, in a case of the passing current value exceeding a protection range including the permitted range, during execution of PWM control, i.e. case of overcurrent occurring. While performing PWM control of the voltage converter 5, it is thereby possible to protect various electrical components provided to the first power circuit 2 or second power circuit 3, in a case of overcurrent exceeding the protection range flowing for any reason.

(3) The passing power control unit 73a calculates the correction duty ratio based on the current deviation change rate from after starting PWM control under the base duty ratio until the value of the current deviation exceeds the permitted range. The magnitude of error in the first circuit voltage sensor 24 or second circuit voltage sensor 34 has a correlation with the current deviation change rate immediately after starting PWM control. Consequently, the power supply system 1 can calculate an appropriate correction duty ratio such that brings the passing current value Iact closer to the activation target value Itrg, based on the current deviation change rate. In addition, since the permitted range is set in the protection range for overcurrent protection in the aforementioned way, the time required from after starting PWM control under the base duty ratio until the value of the current deviation exceeds the permitted range is very short. In this regard, in order to calculate the current deviation change rate, it is sufficient for there to be the three sets of data of the time required from after starting PWM control until determining that the value of current deviation exceeded the permitted range, the value of current deviation during start of the PWM control, and the value of current deviation when determining that the value of current deviation exceeded the permitted range. Consequently, according to the power supply system 1, since it is possible to calculate the correction duty ratio by a simple computation, PWM control can be continuously performed even after the value of current deviation exceeds the permitted range.

Second Embodiment

Figure 10:
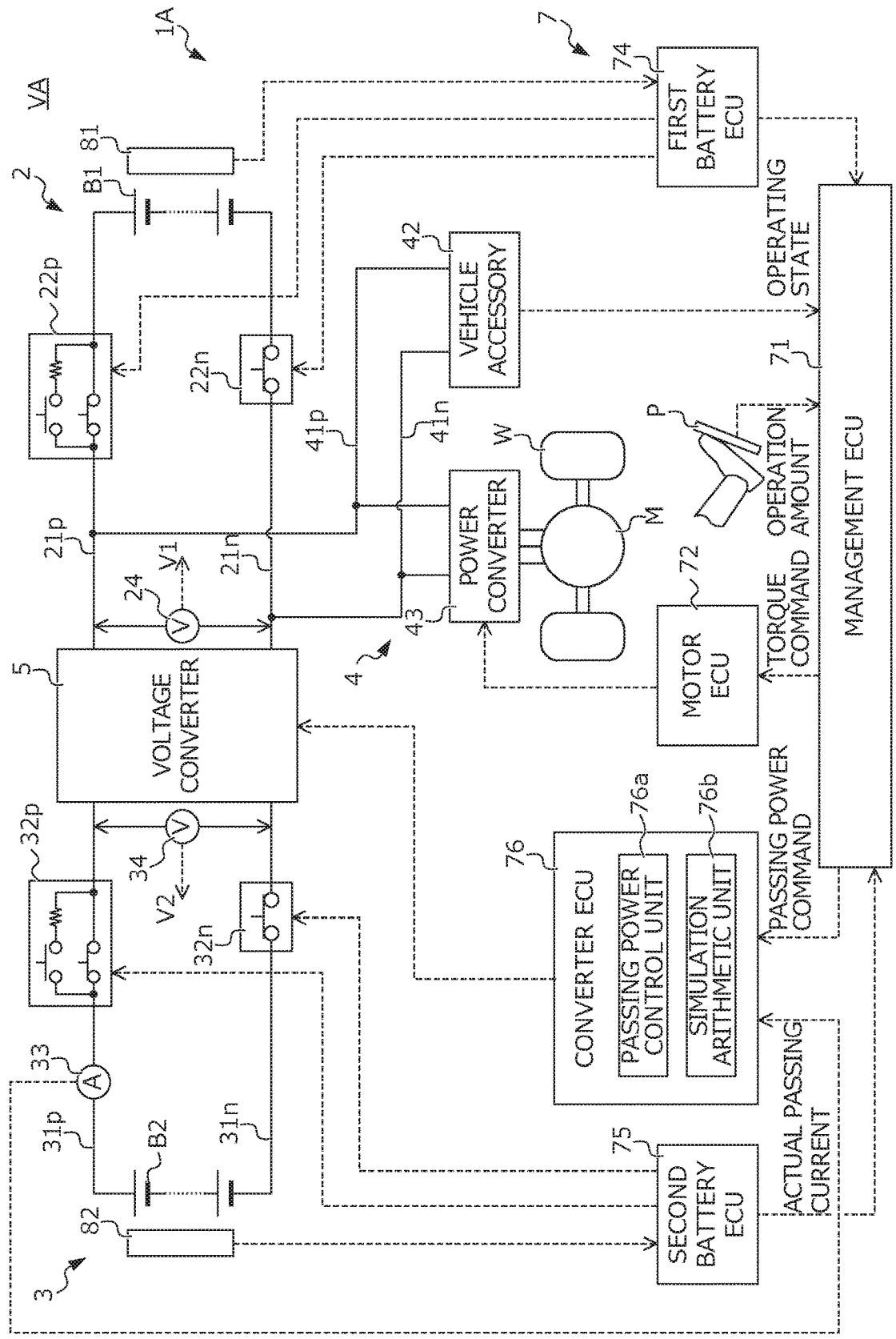
FIG. 10 is a view showing the configuration of a vehicle equipped with a power supply system according to a second embodiment of the present invention.

Next, a second embodiment of the present invention will be explained while referencing the drawings. FIG. 10 is a view showing the configuration of a vehicle VA equipped with a power supply system 1A according to the present embodiment. The power supply system 1A according to the present embodiment differs from the power supply system 1 according to the first embodiment in the configuration of the converter ECU 76 and the specific sequence of activation processing. In the following explanation, the same reference symbols are attached to the configurations and processing which are the same as the power supply system 1 according to the first embodiment, and detailed explanations thereof will be omitted.

The converter ECU 76 is a computer configured by a passing power control unit 76a that is a control module handling management of electric power passing through the voltage converter 5, and a simulation arithmetic unit 76b that is a control module performing simulation operations.

The passing power control unit 76a, in response to a passing power command signal sent from the management ECU 71, operates the high-arm element 53H and low-arm element 53L of the voltage converter 5 by way of PWM control, so that the passing power according to the command passes through the voltage converter 5. The passing power control unit 76a differs from the passing power control unit 73a according to the first embodiment only in the specific sequence of activation processing explained by referencing FIG. 11 later, and the other points thereof are the same as the passing power control unit 73a.

The simulation arithmetic unit 76b acquires time-series data of the passing current value Iact detected by the current sensor 33, voltage values V1, V2 detected by the voltage sensors 24, 34, etc., during activation of the voltage converter 5 by the passing power control unit 76a, and estimates the error of the voltage sensors 24, 34 equipped to the power supply system 1, by performing simulation operation based on the acquired time-series data. More specifically, the simulation arithmetic unit 76b estimates the error of the voltage sensors 24, 34, by repeatedly performing the simulation operation explained by referencing FIGS. 4 to 6 and FIGS. 8 and 9 under various error conditions, and performing under error conditions such that the time-series data of the passing current value Iact and/or voltage values V1, V2 acquired during actual activation of the voltage converter 5 are reproduced. Herein, in order to raise the estimation precision of error of the voltage sensors 24, 34, the above-mentioned time-series data preferably includes data which is during activation of the voltage converter 5 by the passing power control unit 76a, and related to the time change of the value of the current deviation from after starting PWM control under the base duty ratio until the value of the current deviation exceeds the permitted range.

In addition, the simulation arithmetic unit 76b, after estimation of error of these voltage sensors 24, 34 completes, calculates the optimum correction duty ratio, which is the optimum value for the correction duty ratio such that minimizes the value of current deviation (Iact−Itrg) between the passing current value Iact and activation target value Itrg in the case of starting PWM control by the passing power control unit 76a under the estimated error using these estimation results.

Figure 11:
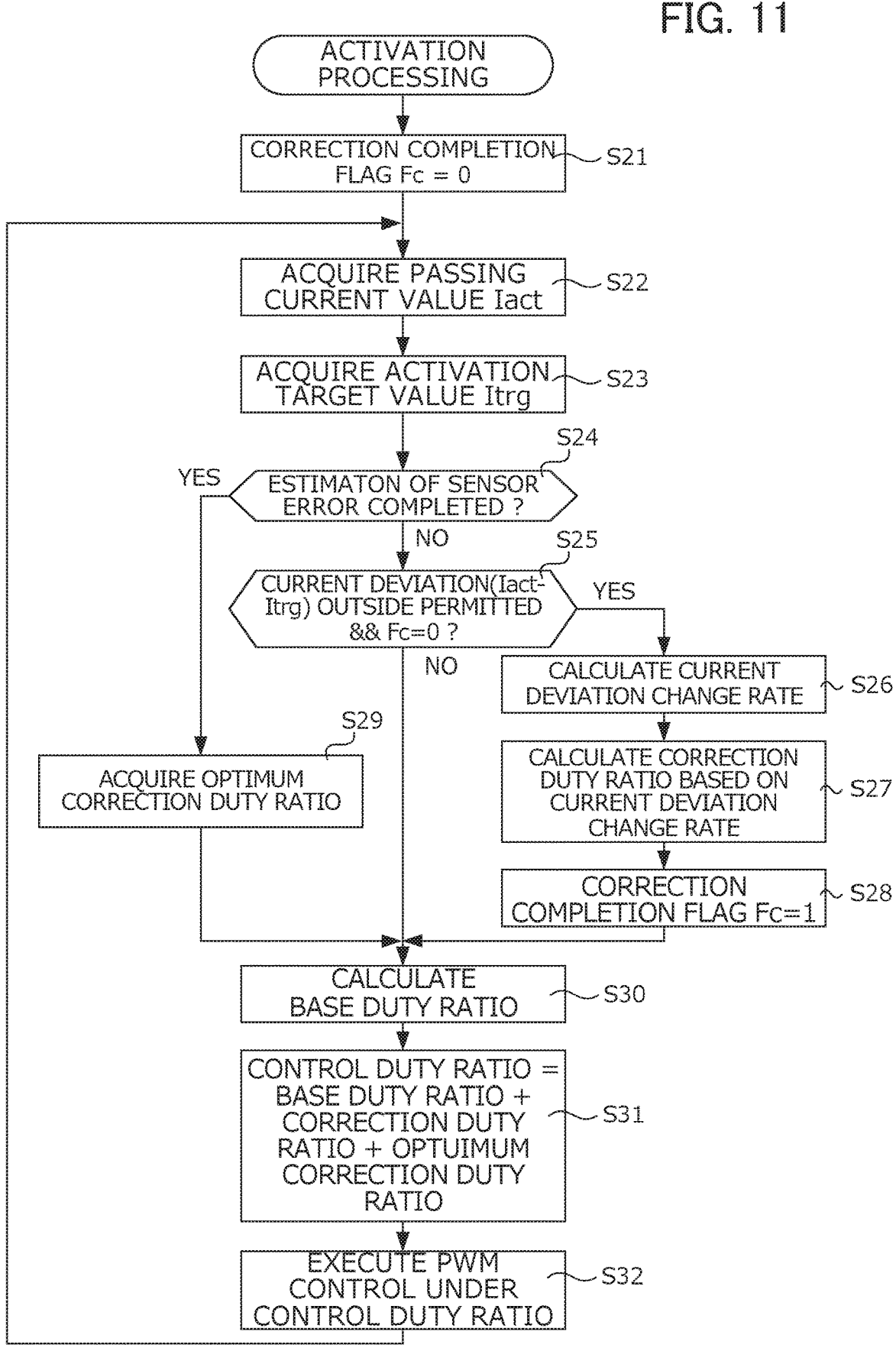
FIG. 11 is a flowchart showing the specific sequence of activation processing of a voltage converter.

FIG. 11 is a flowchart showing the specific sequence of activation processing of the voltage converter 5 in the passing power control unit 76a. The activation processing shown in FIG. 11 is repeatedly executed until activation of the voltage converter 5 ends under a predetermined control cycle by the passing power control unit 76a, in response to an activation request of the voltage converter 5 being produced in a state in which the voltage converter 5 is stopped. It should be noted that the processing of Steps S21 to S23, S25 to S28, S30 and S32 in the activation processing of FIG. 11 are the same as the processing of Steps S1 to S8 and S10 in the activation processing of FIG. 7, and thus detailed explanation thereof will be omitted.

In Step S24, the passing power control unit 76a determines whether estimation of error of the first circuit voltage sensor 24 and second circuit voltage sensor 34 by the aforementioned simulation arithmetic unit 76b has completed. In the case of the determination result of Step S24 being NO, the passing power control unit 76a advances the processing to Step S25.

In Step S29, the passing power control unit 76a acquires the optimum correction duty ratio calculated using the estimation results for the error of the voltage sensors 24, 34 in the simulation arithmetic unit 76b, and then advances the processing to Step S30.

In addition, in Step S31, the passing power control unit 76a calculates the control duty ratio by summing the base duty ratio, correction duty ratio and optimum correction duty ratio, and then advances the processing to Step S32.

In the above way, the activation processing shown in FIG. 11 is the same sequence as the activation processing explained by referencing FIG. 7, until the estimation of the error of the voltage sensors 24, 34 by the simulation arithmetic unit 76b completes. In other words, the passing power control unit 76a, in a case of the value of current deviation exceeding the permitted range after starting PWM control under the base duty ratio during activation of the voltage converter 5, performs PWM control under the duty ratio obtained by summing the correction duty ratio calculated based on the current deviation change rate and the base duty ratio.

In addition, with the activation processing shown in FIG. 11, during activation of the voltage converter 5 after estimation of the error of the voltage sensors 24, 34 by the simulation arithmetic unit 76b has completed, the passing power control unit 76a starts PWM control under a duty ratio obtained by summing the base duty ratio, and the optimum correction duty ratio calculated so that the value of the current deviation (Iact–Itrg) between the passing current value Iact and activation target value Itrg becomes a minimum under the estimation results for the error of the voltage sensors 24, 35 in the simulation arithmetic unit 76b. So long as being after the estimation of the error of the voltage sensors 24, 35 completed, since it is possible to start PWM control under the optimum control duty ratio immediately after activation of the voltage converter 5, disturbance of the passing current can be further suppressed.

According to the power supply system 1A of the above such present embodiment, the following effect is exerted.

(4) The simulation arithmetic unit 76b, by performing simulation based on the time-series data of the value of the current deviation when the voltage converter 5 is activated, estimates the error of the first and second circuit voltage sensors 24, 34, and calculates the optimum correction duty ratio such that makes the value of the current deviation between the passing current value Iact and target value Itrg a minimum in the case of starting PWM control under this error. In addition, the passing power control unit 76a starts PWM control under the control duty ratio obtained by summing the base duty ratio and optimum correction duty ratio, during activation of the voltage converter 5 after the error of the first and second circuit voltage sensors 24, 34 has been estimated by such a simulation arithmetic unit 76b. Consequently, according to the power supply system 1A, so long as being after the error of the first and second circuit voltage sensors 24, 34 has been estimated by the simulation arithmetic unit 76b, since it is possible to perform PWM control under the optimum control duty ratio arrived at by considering the error of the first and second circuit voltage sensors 24, 34, disturbance of the passing current can be further suppressed.

Although an embodiment of the present invention has been explained above, the present invention is not limited thereto. The configuration of detailed parts may be modified as appropriate within the scope of the gist of the present invention.

What is claimed is:

1. A power supply system comprising:
   a first circuit having a first power source;
   a second circuit having a second power source;
   a voltage converter which converts voltage between the first circuit and the second circuit;
   a power converter which converts electric power between the first circuit and a drive motor;
   a first circuit voltage sensor which acquires a first circuit voltage value that is a voltage value of the first circuit;
   a second circuit voltage sensor which acquires a second circuit voltage value that is a voltage value of the second circuit;
   a passing current sensor which acquires a passing current value that is an electrical current value of the voltage converter; and
   a control unit which operates the voltage converter according to PWM control,
   wherein the control unit, in a case of, after starting PWM control under a base duty ratio decided based on the first and second circuit voltage values so that the passing current value becomes a predetermined target value, a value of current deviation between the passing current value and the target value exceeding a permitted range during activation of the voltage converter, performs PWM control under a duty ratio obtained by summing the base duty ratio and a correction duty ratio calculated based on the value of the current deviation.

2. The power supply system according to claim 1, wherein the control unit ends PWM control that is being executed, in a case of the passing current value during execution of PWM control exceeding a protection range that includes the permitted range.

3. The power supply system according to claim 2, wherein the control unit calculates the correction duty ratio based on a change rate of the value of the current deviation from after starting the PWM control under the base duty ratio until the value of the current deviation exceeds the permitted range.

4. The power supply system according to claim 3, further comprising a simulation arithmetic unit which estimates error of the first circuit voltage sensor and the second circuit voltage sensor, by performing simulation based on time-series data of the value of the current deviation from after starting PWM control under the base duty ratio until the value of the current deviation exceeds the permitted range, and calculates an optimum correction duty ratio, which is an optimum value for the correction duty ratio such that makes deviation between the passing current value and the target value a minimum, in a case of starting PWM control under the error,
   wherein the control unit starts PWM control under a duty ratio obtained by summing the base duty ratio and the optimum correction duty ratio, during activation of the voltage converter after error of the first circuit voltage sensor and the second circuit voltage sensor has been calculated by the simulation arithmetic unit.

5. The power supply system according to claim 2, further comprising a simulation arithmetic unit which estimates error of the first circuit voltage sensor and the second circuit voltage sensor, by performing simulation based on time-series data of the value of the current deviation from after starting PWM control under the base duty ratio until the value of the current deviation exceeds the permitted range, and calculates an optimum correction duty ratio, which is an optimum value for the correction duty ratio such that makes deviation between the passing current value and the target value a minimum, in a case of starting PWM control under the error, wherein the control unit starts PWM control under a duty ratio obtained by summing the base duty ratio and the optimum correction duty ratio, during activation of the voltage converter after error of the first circuit voltage sensor and the second circuit voltage sensor has been calculated by the simulation arithmetic unit.

6. The power supply system according to claim 1, wherein the control unit calculates the correction duty ratio based on a change rate of the value of the current deviation from after starting the PWM control under the base duty ratio until the value of the current deviation exceeds the permitted range.

7. The power supply system according to claim 6, further comprising a simulation arithmetic unit which estimates error of the first circuit voltage sensor and the second circuit voltage sensor, by performing simulation based on time-series data of the value of the current deviation from after starting PWM control under the base duty ratio until the value of the current deviation exceeds the permitted range, and calculates an optimum correction duty ratio, which is an optimum value for the correction duty ratio such that makes deviation between the passing current value and the target value a minimum, in a case of starting PWM control under the error, wherein the control unit starts PWM control under a duty ratio obtained by summing the base duty ratio and the optimum correction duty ratio, during activation of the voltage converter after error of the first circuit voltage sensor and the second circuit voltage sensor has been calculated by the simulation arithmetic unit.

8. The power supply system according to claim 1, further comprising a simulation arithmetic unit which estimates error of the first circuit voltage sensor and the second circuit voltage sensor, by performing simulation based on time-series data of the value of the current deviation from after starting PWM control under the base duty ratio until the value of the current deviation exceeds the permitted range, and calculates an optimum correction duty ratio, which is an optimum value for the correction duty ratio such that makes deviation between the passing current value and the target value a minimum, in a case of starting PWM control under the error, wherein the control unit starts PWM control under a duty ratio obtained by summing the base duty ratio and the optimum correction duty ratio, during activation of the voltage converter after error of the first circuit voltage sensor and the second circuit voltage sensor has been calculated by the simulation arithmetic unit.

* * * * *